Oct. 20, 1953    C. A. POSSON    2,655,819
VARIABLE TRANSMISSION MECHANISM
Filed June 9, 1951    5 Sheets-Sheet 1

Inventor.
Chester A. Posson
By Harvey M. Gillespie
Atty.

Inventor:
Chester A. Posson
By Harvey M. Gillespie
Atty.

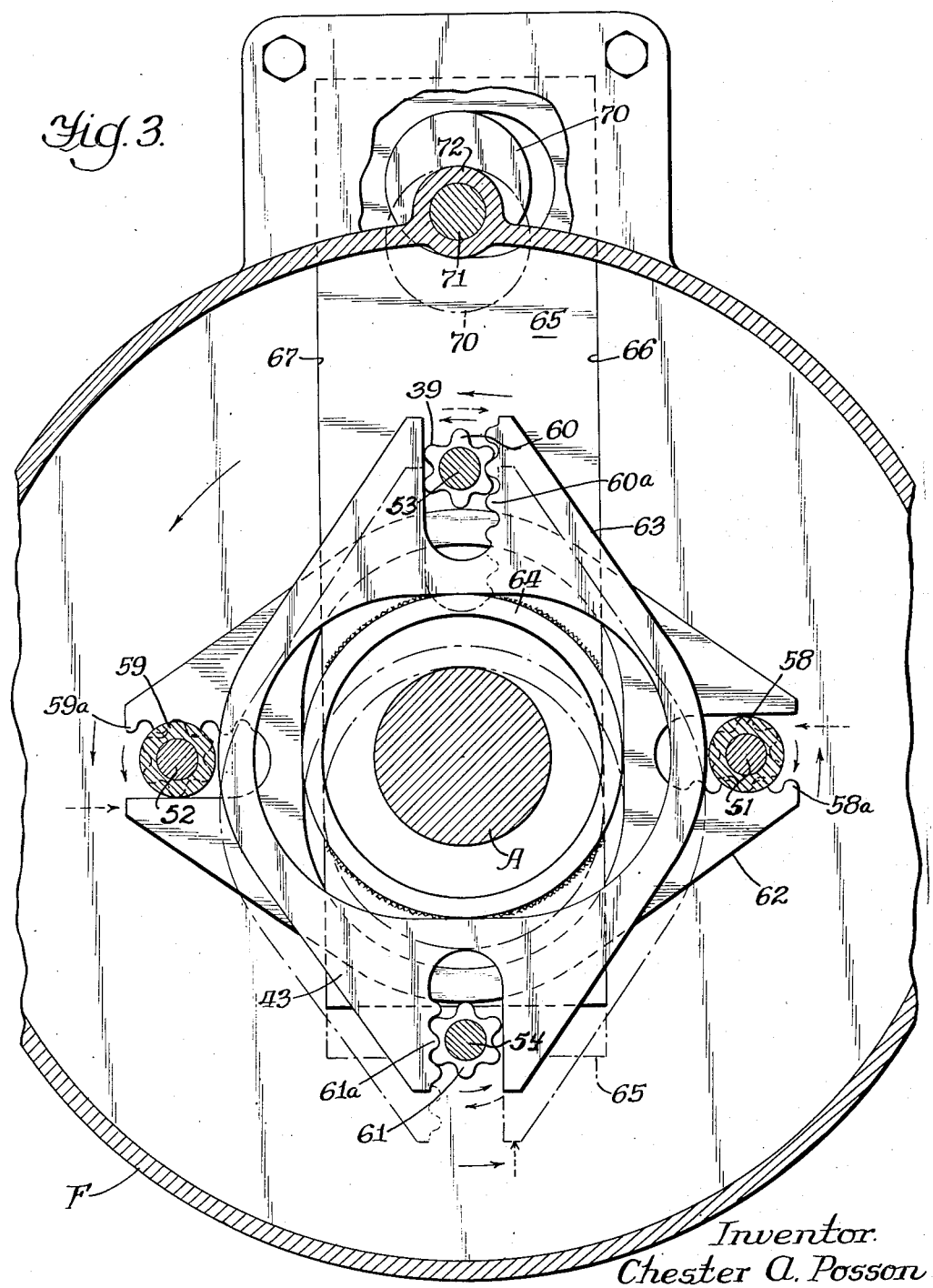

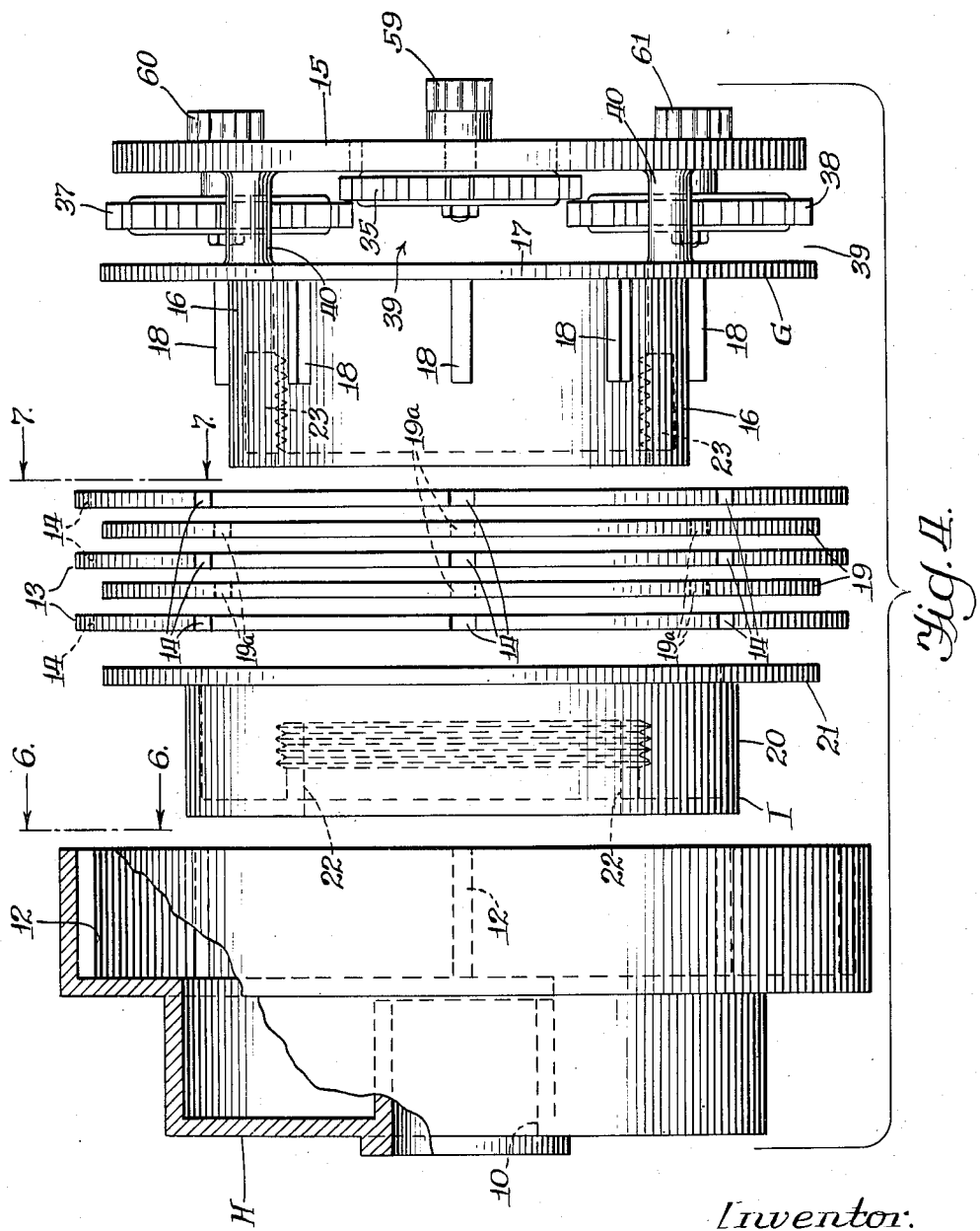

Oct. 20, 1953 C. A. POSSON 2,655,819
VARIABLE TRANSMISSION MECHANISM
Filed June 9, 1951 5 Sheets-Sheet 5
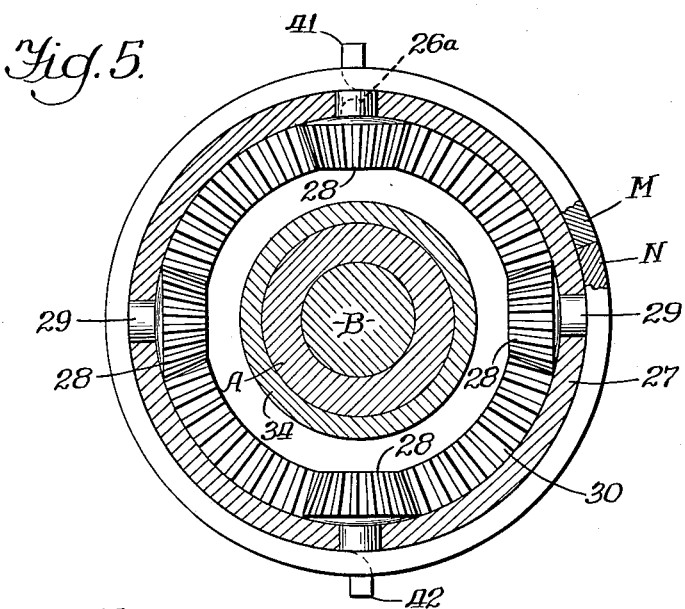
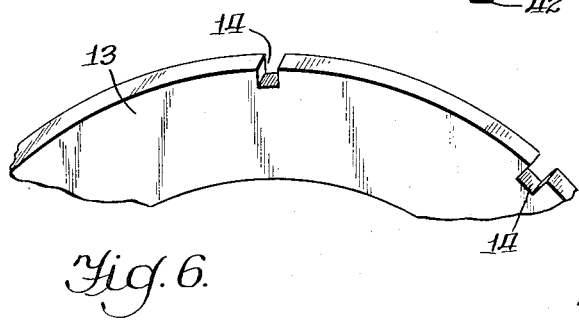
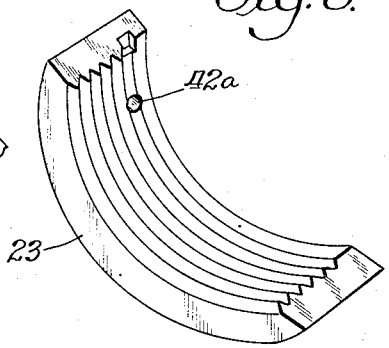
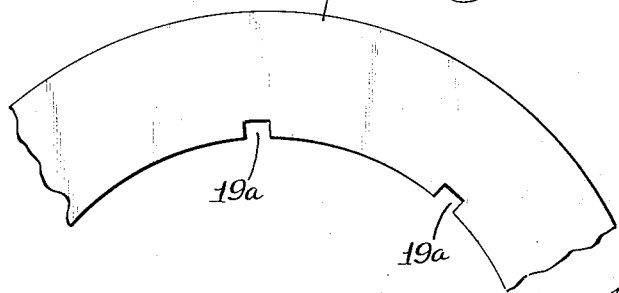
Inventor.
Chester A. Posson
By Harvey M. Gillespie
Atty.

Patented Oct. 20, 1953

2,655,819

UNITED STATES PATENT OFFICE 2,655,819

VARIABLE TRANSMISSION MECHANISM

Chester A. Posson, Chicago, Ill.

Application June 9, 1951, Serial No. 230,805

12 Claims. (Cl. 74—679)

1

This invention relates to certain new and useful improvements in variable transmission mechanisms.

A principal object of the invention is to provide a reliable mechanism of the above character in which a driven shaft may be arranged in axial alignment with a power shaft and operated by the latter at any selected speed desired, ranging from zero to the full speed of the power shaft.

Another object of the invention includes the provision of novel constructions and arrangements whereby the various parts of the mechanism will be substantially balanced and thereby permit operation of the mechanism at high speed without the attending vibrations which are usually present in high speed revolvable mechanism when the elements are out of balance.

Another object of the invention is to provide a variable transmission mechanism of the above general character in which a driven shaft or other member may be operated at any selected speed and the speed of operation selected will be substantially constant relative to the rotational speed of the power shaft.

A further object of the invention includes the provision of the novel arrangements and combinations of parts and devices hereinafter described and claimed for carrying out the above stated objects and for attaining such other objects and advantages as will appear from the following specification.

A variable transmission mechanism constructed in accordance with this invention is illustrated in the accompanying drawings wherein:

Fig. 3 is a cross-sectional view taken on line 3—3 of Fig. 1, illustrating a pair of yokes embodied in the structure of Fig. 1 and showing also a means employed for adjusting the position of the yokes relative to the rotational axis of a power shaft.

Fig. 4 is a view in side elevation of several of the elements embodied in a clutch mechanism shown in Fig. 1 for transmitting movement from the power shaft to the driven shaft.

Fig. 5 is a cross-section taken through a differential gear assembly embodied in the mechanism; this sectional view being taken substantially on line 5—5 of Fig. 1, but showing in elevation a pair of coiled spring elements which connect the differential gear assembly with adjacent parts of the clutch mechanism.

Fig. 6 is a fragmentary view in perspective showing a notched periphery of a clutch plate forming a part of an outer clutch element illustrated in Fig. 4.

Fig. 7 is a fragmentary side view of a clutch plate forming a part of an inner clutch element illustrated in Fig. 4.

Fig. 8 is a view in perspective of one segment of a threaded thrust ring forming a part of the inner clutch element.

Figure 1:
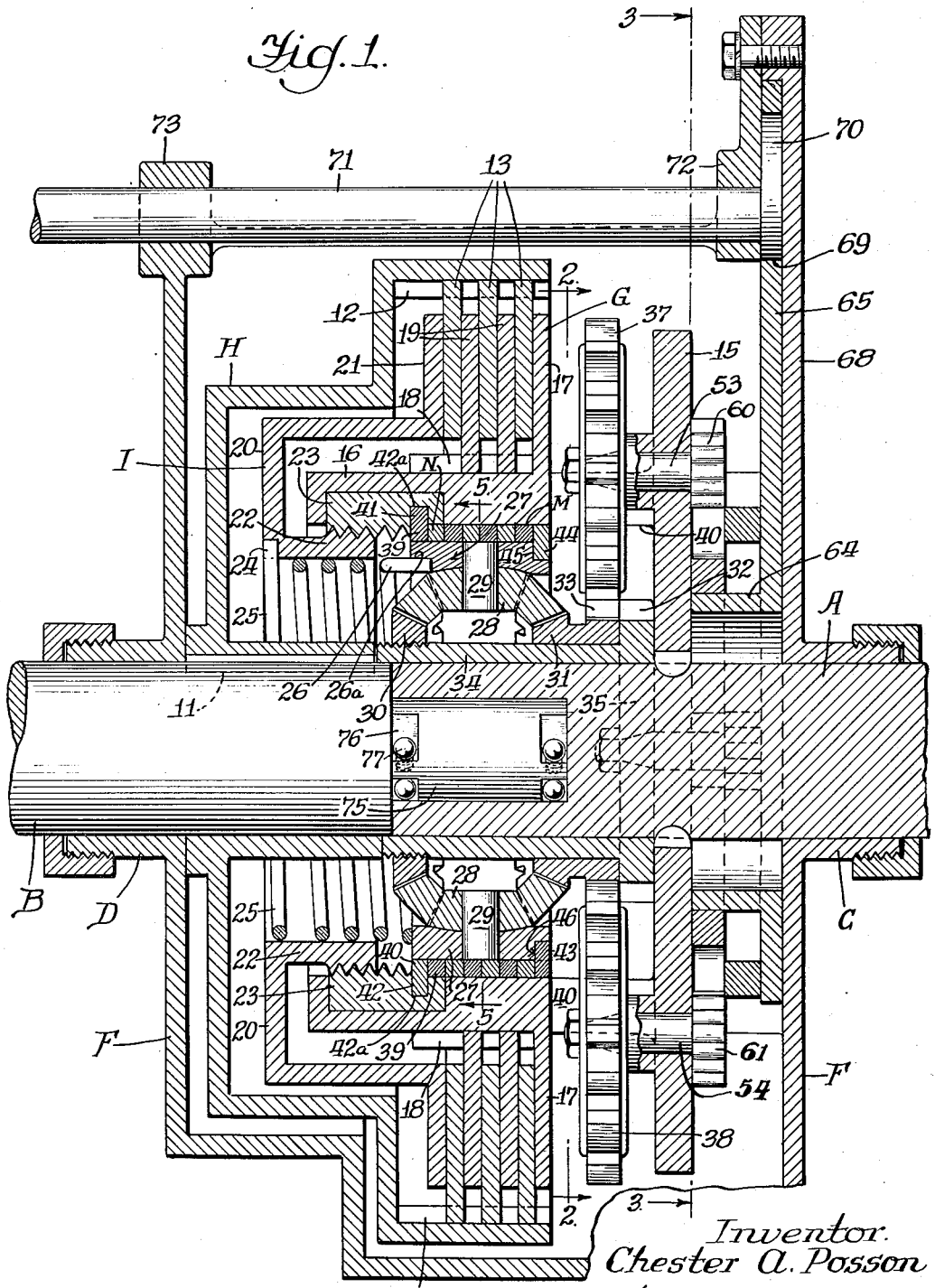
Fig. 1 is a vertical sectional view taken through a variable transmission mechanism constructed in accordance with the invention.

The invention, as illustrated in the accompanying drawings, includes a power shaft A and a driven shaft B arranged in axial alignment with each other. The shafts A and B are journaled in suitable bearings C, D of a housing F which encloses the operating parts of the transmission mechanism. The rotational movements of the power shaft A are transmitted to the driven shaft B by means of a clutch mechanism designated as a whole by the reference character G. This mechanism includes a clutch element G operatively connected to the power shaft A, a clutch element H secured to the driven shaft B, and a clutch actuating mechanism I for frictionally connecting the two clutch elements G and H. The element H of the clutch mechanism constitutes an outer shell of the clutch. It is of dished configuration in cross-section and is provided with an inwardly extending hub portion 10. This portion is fixed to the driven shaft B, preferably by means of a suitable key 11. The inner periphery of the clutch element H is provided with a series of ribs 12, which provide splined connections between the shell H and a series of annular friction plates 13. The outer periphery of each plate is notched as indicated in 14 (Figs. 4 and 6) to fit over the ribs 12. It will be seen, therefore, that the annular plates 13 will rotate with the shell H and the driven shaft B, but have capacity for movement lengthwise of the ribs 12. The clutch element G, shown best in Figs. 1 and 4, comprises an end plate 15 and a cylindrical portion 16 extending outwardly from the inner face of the plate 15 to form a hub. This hub extends into the outer shell H of the clutch, when the elements G and H are in their established relation. The cylindrical portion 16 of the clutch element G is formed on its outer surface with a series of spaced ribs 18 for receiving the notched inner periphery of a series of annular friction plates 19 (Figs. 1, 4 and 7). The ribs 18 and the notches 19a in the plates 19 provide an interlocking engagement between the clutch element G and each of the said plates 19 whereby the plates will rotate with the clutch element G, but have capacity to move toward and away from the integral end disk 17. The plates 13 and 19 of the clutch elements G and H are disposed in alternate relation so as to have frictional engagement with each other as shown in Fig. 1. It will be observed that if the clutch plates 13 and 19 are clamped immovably against each other, the driven shaft B will be rotated at the same speed as the power shaft A. However, if the clamping engagement between the clutch plates 13 and 19 is such as to permit slippage, the driven shaft B will operate at a speed slower than the power shaft A. Consequently, the operating speed of the driven shaft B relative to the operating speed of the power shaft A may be controlled by controlling the amount of slippage between the said friction plates 13 and 19.

The above mentioned slippage is controlled, in the present embodiment of this invention, by varying the pressure exerted by a clutch shoe 20 against the friction rings 13 and 19 of the clutch. There is a tendency, as will be apparent from the description hereinafter, for the shoe 20 to exert maximum clamping pressure against said friction rings. This tendency is the result of the construction whereby a hub portion 22 of the shoe 20 has a threaded engagement with an internally threaded thrust ring 23 (Figs. 1, 4 and 8) positioned in channel 23a formed in the portion 16 of clutch element G. One end 24 of a torsion spring 25 (Fig. 1) engages said hub portion 22 of the shoe 20 and the other end 26 of the spring is engaged in a socket 26a of a ring 27 (Figs. 1 and 5), the said ring forming a part of a differential gear mechanism hereinafter described. The torsion exerted by the spring 25 tends to rotate the shoe 20 relative to the thrust ring 23, whereby the threaded engagement of the shoe and ring forces the shoe lengthwise of the shaft A into increased clamping engagement with the said friction plates 13, 19 of the clutch.

The driven shaft B is rotated at a reduced speed relative to the speed of the power shaft A by relieving the said clamping action of the shoe 20 so as to permit the desired slippage or escapement between the clutch plates 13 and 19. This result is obtained by differential gear means operatively connected to the clutch actuating mechanism and a train of gears operatively connecting said differential gear means to the power shaft A. This train of gears includes a plurality of bevel pinions 28 journaled to rotate about stub shafts 29 extending inwardly from the inner face of the ring 27. Preferably the inner face of the ring 27 is formed with shallow depressions which correspond in contour to the outer faces of the pinions 28 (Figs. 1 and 5). There are preferably, though not necessarily, four bevel pinions 28 and they mesh with the bevel gears 30, 31 at opposite sides of their axes of rotation. The bevel gears are connected respectively to spur tooth gears 32 and 33, respectively. The bevel gear 30 is connected to the spur tooth gear 32 by means of a sleeve 34 (Fig. 1) which is rotatably mounted on the inner end of the power shaft A. The bevel gear 31 is made integral with the spur tooth gear 33 (Fig. 1) and is journaled to rotate about the outer surface of the said sleeve 34. The spur tooth gears 32 and 33, and consequently the bevel gears 30 and 31 affixed thereto, are rotated in opposite directions by means of pairs of gears 35, 36 and 37, 38. Both pairs of gears are carried on the end plate 15 of the clutch element G, as shown best in Figs. 2 and 4. The gears 35, 36 (Fig. 2) mesh with the gear 32 and the gears 37, 38 (Figs. 1 and 2) mesh with the gear 33. Both pairs of gears 35, 36 and 37, 38 extend through slots 39 (Figs. 2 and 4) formed in the cylindrical portion 16 of the clutch element G between the end disk 15 and fixed clutch plate 17. The portions of the cylinder 16 which remain between the slots 39 are designated by the reference numeral 40 in Figs. 1, 2 and 4.

Each of the gears 35, 36 and 37, 38 form parts of oscillating clutch members which are alternately effective to impart rotational movement to the gear 32 or 33. The said gears 32 and 33 are rotated in a direction opposite to the movement of the power shaft A. At times they may be rotated at speeds equal to the speed of the power shaft. In such event, because of the reverse direction of their movement, they will merely offset the movement of the power shaft and therefore will not impart any movement to the ring 27. However, if the gears 32, 33 are rotated slower than the power shaft A this slower movement of the gears results in producing a movement of the ring 27 relative to the shaft A, but in the same direction of the said shaft A. This movement of ring 27 is transmitted to the driven shaft B so that the shaft B will rotate at the same speed as the ring and in the same direction as the ring and the power shaft A.

In order to transmit the said movement of ring 27 to the shaft B, any suitable means may be employed for operatively connecting the said ring to the shaft. The means herein shown for accomplishing this purpose comprises a pair of intertwined helical springs M and N, of square cross-section, interposed between the outer surface of ring 27 and the inner surface of the cylindrical portion 16 of clutch element G. The inner ends of said springs M, N are turned outwardly (see Figs. 1 and 5) to form studs 41 and 42 for attachment with the threaded thrust ring 23, the stud 41 of spring M fitting into a socket 42a formed in one segment of the ring 23 and the end 42 of spring N fitting into a similar socket 42a formed in another segment of the ring 23. The other ends of said springs M and N are bent inwardly to provide studs 43 and 44 which fit into pockets 45, 46 formed in a side face of the ring 27 (Fig. 1). As the ring 27 rotates in the normal direction of movement of the power shaft A the ends of the springs M, N are moved in a direction to contract the diameters of the springs and thereby release the frictional bearing of the springs M, N against the inner surface of the cylindrical portion 16 of clutch element G. In this way the revolving movement of the ring 27 is transmitted to the threaded thrust ring 23 so as to constantly tend to draw the shoe 20 toward the clutch plates 13 and 19 and thereby increase its clamping action thereon. It will be seen, therefore, that there will be a slipping action of the thrust ring 23 relative to the clutch element G sufficient to partially offset or reduce the torsion of spring 25 and thereby permit only sufficient slippage between the clutch plates 13, 19 to permit the driven shaft to rotate at the same rates as the ring 27.

Referring again to the means for operating the ring 27: The pairs of gears 35, 36 and 37, 38, are in the form of ring gears mounted respectively on pairs of oscillating cores 47, 48 and 49, 50. These several cores are all of identical construction and are fixed in pairs to shafts 51, 52 and 53, 54 journaled in bearing openings formed in disk 15. Each core is provided with a series of angular recesses 55, containing a roller 56 for clutching together the core and its associated ring gear. The rollers 56 are normally pressed by spring 57 toward the narrow ends of the recesses 55. Consequently, when the cores are rotated in a counter-clockwise direction, with reference to Fig. 2, they are moved into the narrow ends of the recesses 55 to effect binding contact between the cores and the ring gears. When the cores 47 are rotated in reverse direction, the rollers 56 are moved into the upper end of the recesses 55 so that the cores are permitted to turn free of their associated ring gears.

Figure 2:
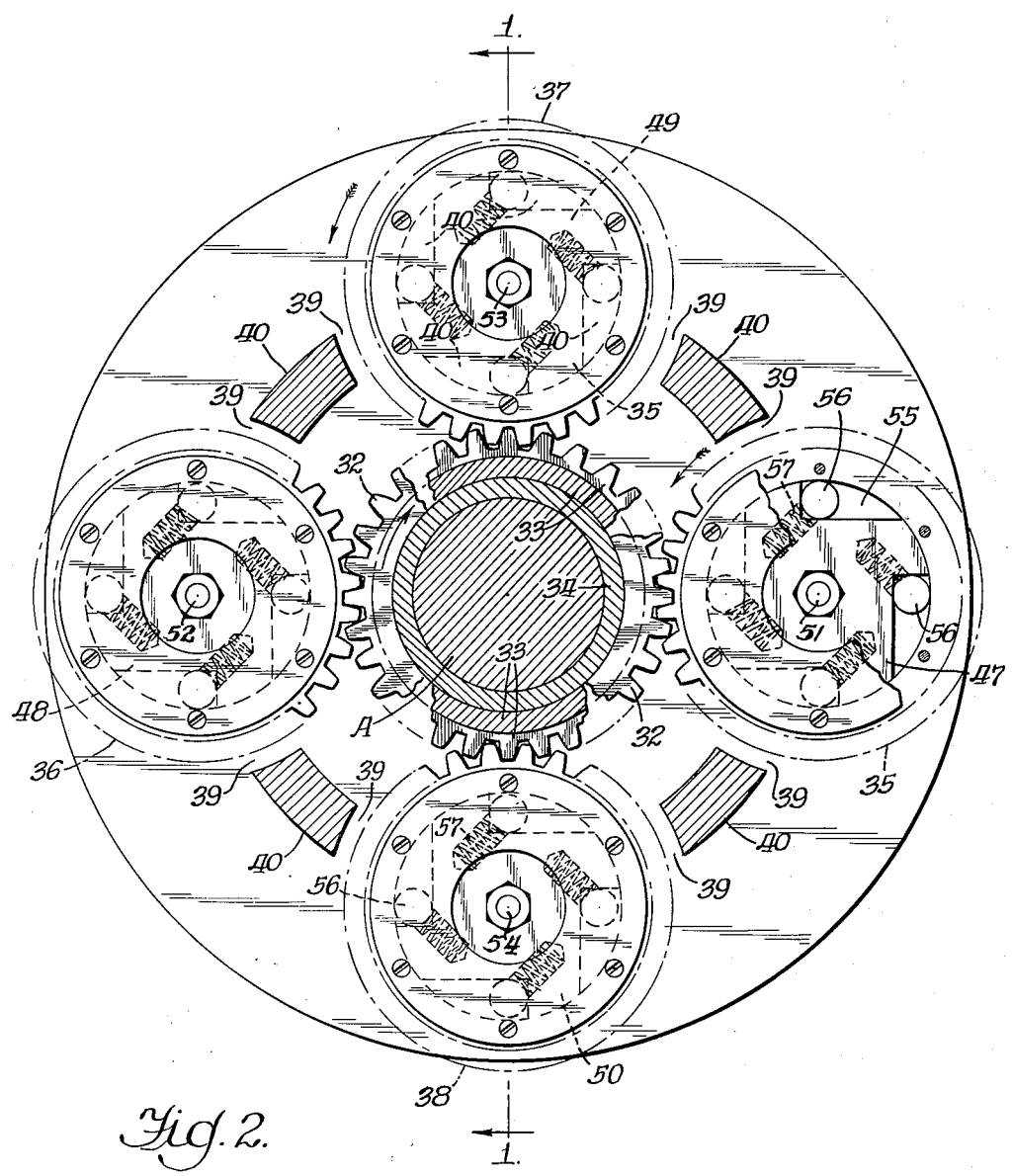
Fig. 2 is a cross-sectional view taken on line 2—2 of Fig. 1, looking in the direction indicated by the arrows and showing also one of the gear elements broken away to show parts of a similar gear element positioned back of the first mentioned gear.

The gears 35, 36, as will be observed from Fig. 2, are arranged to mesh with sleeve gear 32 at opposite sides of its axis and are rotated by oscillations of their roller clutch cores 47. The gears 37, 38 are mounted to mesh with opposite sides of the sleeve gear 33 and are rotated by the oscillations of their associated roller clutches.

The roller clutches of each pair of gears 35, 36 and 37, 38 are oscillated in opposite directions by means of pairs of pinions 58, 59 and 60, 61 fixed on shafts 51, 52 and 53, 54 and engaged with the opposite ends of yokes 62 and 63. The yoke 62 is mounted to rotate about a circular race 64 and is provided at opposite ends with two series of teeth 58ᵃ, 59ᵃ for engaging the pinions 58 and 59, respectively. The yoke 63 is mounted to rotate about said race 64 and is provided with two series of teeth 60ᵃ, 61ᵃ for engagement with the pinions 60, 61. The race 64 is adapted to be adjusted to various eccentric positions relative to the axis of shaft A. For this purpose, the said race 64 is formed on a plate 65 which is slidably mounted in guideway 66, 67 formed in the front wall 68 of the mechanism housing. The upper end of the plate 65 is formed with an opening 69 for receiving an eccentric cam 70 mounted on a control shaft 71. The control shaft is journaled in bearings 72, 73 and is adapted, when rotated, to move the race 64 from a position concentric with the axis of the power shaft A (see full lines of Fig. 3) to a position eccentric thereto (see broken line position shown in Fig. 3). It will be observed, therefore, that the rotation of the yokes about the race 64, when the latter is adjusted to a position eccentric to the power shaft A, produces an oscillating effect on the pinions 58, 59, 60 and 61 and consequently the oscillations of the said pinions are imparted to the clutch cores 47 of the associated ring gears 35, 36, 37 and 38 and thence to sleeve gears 32, 33.

In order to simplify the assembly of the thrust ring 23 within the annular recess 23ᵃ formed in the cylindrical portion 16 of the clutch element G, the said thrust ring is formed preferably in three segments. These segments are held in position within the said recess 23ᵃ by reason of the threaded engagement of the ring with the threaded position of the shoe 20.

*Summary of operation*

When the race 64 is in a position concentric to the axis of the power shaft A, as shown in full lines in Fig. 3, the driven shaft B is rotated at the same speed as the power shaft A by virtue of the fact that the yokes 62, 63 do not impart any oscillatory movements to the pinions 58, 59, 60 and 61. In such case there is no rotation of the bevel gears 30, 31 relative to the power shaft A. Consequently the torsion spring 25 functions to move the clutch shoe 20 relative to the thrust ring 23 and thereby forces the said shoe into fixed clamping engagement with the friction plates 13, 19. In such case, all parts of the differential gear mechanism, including the ring 27, rotate with the shaft A, the clutch mechanism being made effective, since the torsion exerted by spring 25, as an incident to the movement of shaft A, tends to move the said ring 27 in a direction to expand the coil springs M, N into binding engagement with the inner surface of the cylindrical portion 16 of clutch element G. It will be seen, therefore, that all elements of the clutch mechanism will rotate with the power shaft A as a unit.

When the control shaft 71 is rotated so that the cam 70 will force the slide plate 65 downwardly and thereby move the race 64 to its extreme eccentric position, as shown in broken lines in Fig. 3, the opposite ends of yoke 62, in cooperation with their associated pinions 58, 59, clutches 47, 48 and ring gears 35, 36, function to impart through the sleeve gear 32 (Figs. 1 and 2), one full revolution to the bevel gear 30 for each complete revolution of the yoke 62 and power shaft A; the rotation of the bevel gear 30 being at the same speed as the power shaft but in the opposite direction. Likewise, for each full revolution of the power shaft A while the race 64 is in its maximum eccentric position the ends of the yoke 63, in cooperation with their associated pinions 60, 61, clutches 49, 50 and ring gears 37, 38 function to impart through the sleeve gear 33 one full rotation to the bevel gear 31 in a direction opposite to the movement of the power shaft A. It will be observed, therefore, that inasmuch as both bevel gears 30 and 31, when the race 64 is in its maximum eccentric position, are rotated at an equal rate to the rotation of the power shaft, but in the opposite direction, the several bevel pinions 28 and their associated ring 27 will remain stationary in relation to the fixed elements of the casing. Under such conditions there will be no motion transmitted from the power shaft A to the driven shaft B. However, if the race 64 is adjusted to any position intermediate its position concentric with the axis of power shaft A and its maximum adjusted position eccentric thereto, the amplitude of oscillation of the pinions 58, 59 and 60, 61 imparts oscillations of corresponding amplitude to the clutch elements of gears 35, 36 and 37, 38 so that the sleeve gears 32, 33 are rotated in a manner to impart a rotational movement to the ring 27 in the same direction as the movement of the power shaft A, but at a reduced speed; the speed being determined by the adjustment of race 64 and its variation of the amplitude of movement of the clutches 47, 48, 49 and 50, per each rotation of the yokes 62 and 63. The movement of ring 27, as just described, functions to tighten the coils of springs 39 and 40 so as to release their frictional engagement with the clutch element G and to thereby permit the threaded thrust ring 23 to be moved relative to the clutch element G in a direction to partly counteract the torsion of the spring 25 and thereby permit suitable slippage between the frictional faces of the clutch plates 13, 19 so that the movement of the ring 27 in the direction of the movement of the power shaft A will be transmitted through the clutch connections to the driven shaft B. Under such conditions the driven shaft B will be operated at a speed corresponding to the speed of movement of the ring 27.

In some instances it may be desirable to impart movement to the power shaft A from the driven shaft B. In such case, the shaft B is provided with a reduced portion 75 which fits within a cylindrical recess formed in the end of the power shaft A. The reduced portion 75 is provided with annular recess 76 corresponding in shape to the recess 55 of the roller clutch mechanism and ball elements 77 are positioned so that reverse movement of the shaft B will bring about a clutch engagement between the balls 77 and the power shaft A and thereby impart reverse rotational movement to the power shaft A. However, under normal conditions of transmitted power from the power shaft A to the driven shaft B, the clutch balls 77 will be ineffective as clutch members.

I claim:

1. A variable transmission mechanism including a power shaft, a driven shaft positioned in axial alignment with the power shaft, and means for transmitting rotational movement of the power shaft to the driven shaft comprising a friction clutch mechanism including a friction member fixed to the driven shaft to rotate therewith and a clamp element positioned for frictional engagement with said friction member, a bevel pinion positioned to rotate about an axis extending radially of the power shaft, a support for said bevel pinion rotatable about the axis of the power shaft, a pair of bevel gears revolvable about the axis of the power shaft and meshing with said bevel pinion at opposite sides of its axis of rotation, whereby orbital movement of said pinion occurs about the axis of the power shaft at a rate of one full orbital movement per one-half the sum of the total revolutions of each of said bevel gears in the direction of movement of the power shaft; means operatively connecting the said bevel gears to the power shaft including separate trains of gears for imparting movement to each of the bevel gears at various speeds relative to the power shaft in a direction opposite to the movement thereof; and means including a torsion spring for operatively connecting the clamp element of the said clutch mechanism with the support of said bevel pinion, whereby said movement of the pinion support about the axis of the power shaft imparts corresponding rotational movement to the driven shaft.

2. A variable transmission mechanism according to claim 1 characterized in that one gear of each said train of gears includes a one way clutch means associated therewith to provide an operative connection with the power shaft.

3. A variable transmission mechanism according to claim 1 characterized in that the means for operatively connecting each of the bevel gears to the power shaft includes a pair of alternately operable gears operatively connected with each bevel gear and an oscillating clutch member for each alternately operable gear, adapted by successive movements to impart continuous movement to its associated bevel gear.

4. A variable transmission mechanism according to claim 3 characterized in that the support for said bevel pinion is a ring.

5. A variable transmission mechanism as defined in claim 4 characterized in that the operative connection of the bevel gears with the power shaft also includes pinions fixed to the oscillating clutches, racks provided with teeth meshing with the last mentioned pinions and operatively connected through said last mentioned pinions with the power shaft whereby the rack is rotated with said power shaft, and means for adjusting the rotational axis of said racks to various positions eccentric to the axis of the power shaft, whereby rotation of the racks about their axes imparts the oscillating movements to said oscillating clutches and the speed of said oscillating movements and consequently the speed of said driven shaft is varied by the eccentricity of said adjustments of said racks.

6. A variable transmission mechanism according to claim 5 characterized in that the means for adjusting the axes of rotation of said racks includes a race on which the racks are rotatably supported and means for adjusting the position of the race relative to the axis of the power shaft.

7. A variable transmission mechanism according to claim 6 characterized in that the means for adjusting the said race relative to the rotational axis of the power shaft includes a manually operable cam.

8. A variable speed transmission mechanism as defined in claim 1 characterized in that the means for operatively connecting the clamp element of the clutch mechanism with the support for said bevel pinion includes also a thrust ring having threaded engagement with said clamp element and cooperating with said torsion spring to produce axial movement of said clamp element in a direction to move it into frictional clamping engagement with the portion of the clutch which is fixed to the driven shaft.

9. A variable speed transmission mechanism as defined in claim 8 characterized in that the clutch element includes a second clamp element cooperating with the first mentioned clamp element to frictionally clamp between them a clutch element which is fixed to the driven shaft and further characterized in that said thrust ring is slidably connected with said second clamp element, whereby the reaction of the torsional spring on the threaded engagement on the first mentioned clamp element and said thrust ring imparts axial movement to both said clamp elements in a direction to frictionally clamp between them the portion of the clutch which is fixed to the driven shaft.

10. A variable speed transmission mechanism as defined in claim 9 characterized by the provision of a coil spring connecting said bevel pinion support with said thrust ring and arranged to counteract a portion of the force exerted by said torsion spring and thereby permit limited slippage of the friction clutch elements in proportion to the load resistance on said driven shaft.

11. A variable speed transmission mechanism as defined in claim 1 characterized by the provision of a reverse clutch device for effecting direct connection between the power shaft and the driven shaft and operable upon reverse movement of said driven shaft to transmit said reverse movement to the power shaft.

12. A variable speed transmission mechanism as defined in claim 11 characterized in that the reverse clutch device is a one way roller clutch interposed between the power and the driven shafts.

CHESTER A. POSSON.

References Cited in the file of this patent

UNITED STATES PATENTS

| Number | Name | Date |
|---|---|---|
| 2,387,401 | Marco | Oct. 23, 1945 |
| 2,547,453 | Egy | Apr. 3, 1951 |